United States Patent [19]
Fuss et al.

[11] Patent Number: 5,468,556
[45] Date of Patent: Nov. 21, 1995

[54] SHAPED LOOSE-FILL PACKAGING PARTICLE AND METHOD FOR MAKING THE SAME

[75] Inventors: Gunter G. Fuss, San Mateo; Vladimir Yampolsky, San Carlos, both of Calif.

[73] Assignee: Free-Flow Packaging Corporation, Redwood City, Calif.

[21] Appl. No.: 113,777

[22] Filed: Aug. 27, 1993

[51] Int. Cl.[6] .................................................. B32B 9/00
[52] U.S. Cl. .......................... 428/369; 428/33; 428/58; 428/84; 428/120; 428/154; 428/156; 428/159; 428/192; 428/218; 428/402; 428/542.8; 428/906
[58] Field of Search ........................ 428/120, 159, 428/84, 154, 218, 369, 58, 74, 192, 156, 402, 33, 542.8, 906

[56] References Cited

U.S. PATENT DOCUMENTS

| | | |
|---|---|---|
| 3,074,543 | 1/1963 | Stanley . |
| 3,074,543 | 1/1963 | Stanley .................................. 206/16 |
| 3,481,455 | 12/1969 | Graham et al. . |
| 3,723,237 | 3/1973 | Fuss . |
| 3,855,053 | 12/1974 | Fuss ..................................... 156/244 |
| 3,896,934 | 7/1975 | Graham et al. . |
| 3,951,730 | 4/1976 | Wennberg et al. ...................... 428/116 |
| 4,166,875 | 9/1979 | Bussey ................................. 428/159 |
| 4,169,179 | 9/1979 | Bussey ................................. 428/159 |
| 4,514,153 | 4/1985 | Bussey ................................. 428/159 |
| 4,514,453 | 4/1985 | Bussey, Jr. ........................... 428/159 |
| 4,997,091 | 3/1991 | McCrea ................................ 206/584 |
| 5,028,470 | 7/1991 | Reichenecker .......................... 428/81 |
| 5,188,880 | 2/1993 | Tether ................................ 428/120 |
| 5,312,665 | 5/1994 | Pratt et al. . |

*Primary Examiner*—Patrick J. Ryan
*Assistant Examiner*—Abraham Bahta
*Attorney, Agent, or Firm*—Flehr, Hohbach, Test, Albritton & Herbert

[57] ABSTRACT

A shaped particle for use as a loose fill material to surround and cushion an article packaged within a container includes a strip of stiff yet flexible material having a several convoluted regions for absorbing impact energy. The convoluted regions are adapted to compress together to absorb mechanical energy in response to a mechanical force such as would be encountered during an impact and act as resilient springs or bumpers to protect the article. The shaped particle has characteristics that prevents nesting and facilitates interlocking to prevent migration. The invention also provides a method for making embodiments of shaped particles according to the invention.

43 Claims, 8 Drawing Sheets

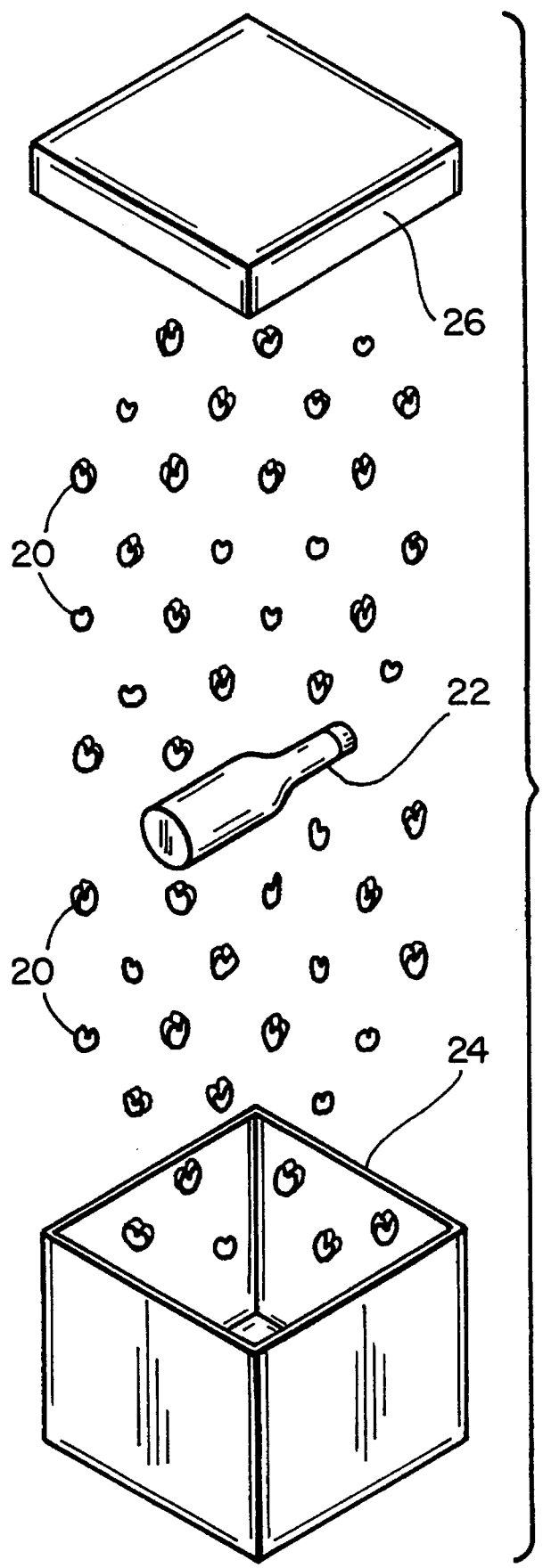
FIG_1

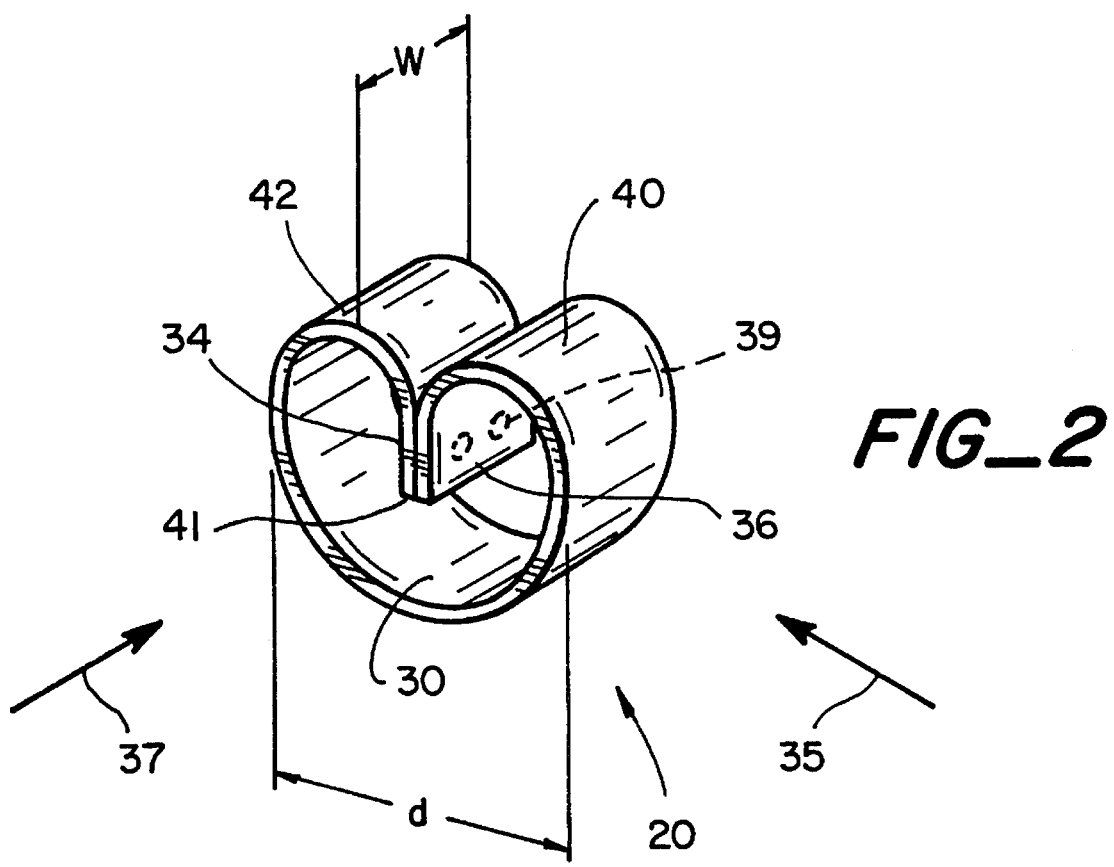
FIG_2
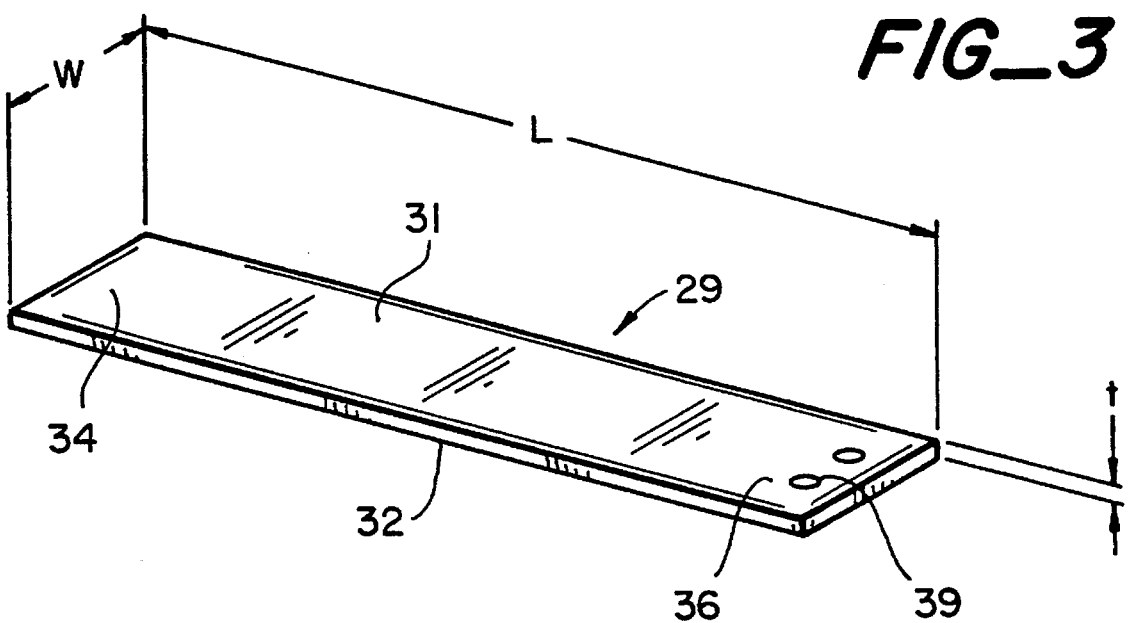
FIG_3

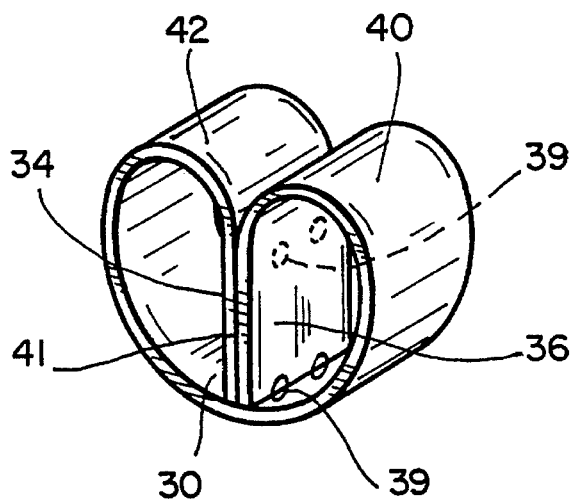
FIG_4
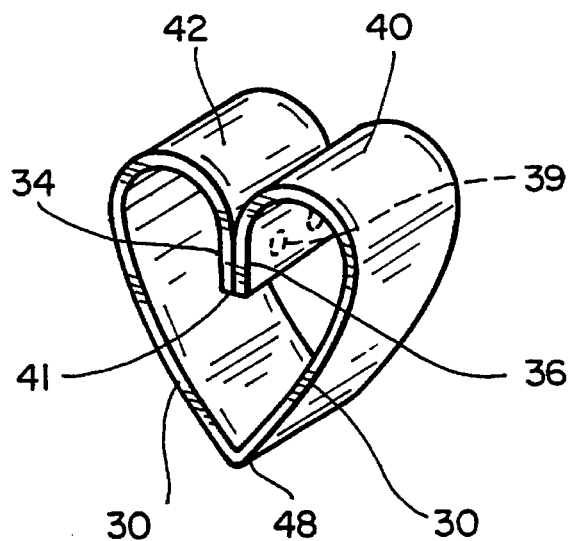
FIG_5
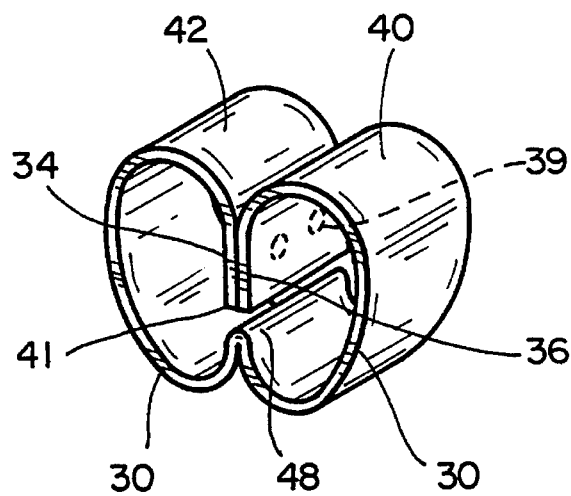
FIG_6

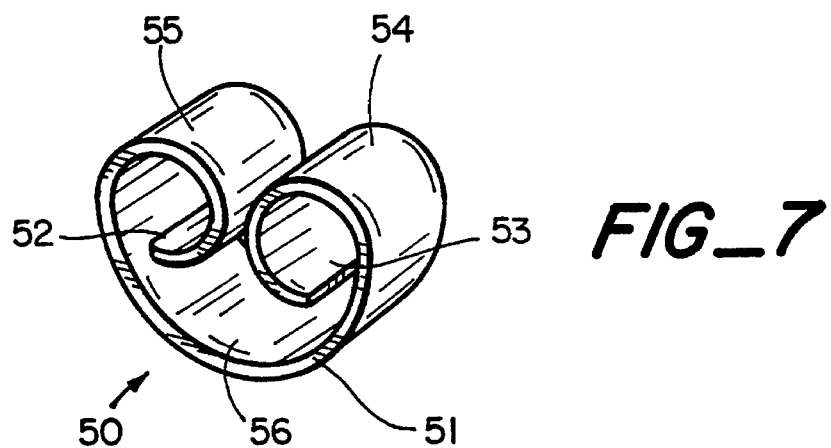
FIG_7
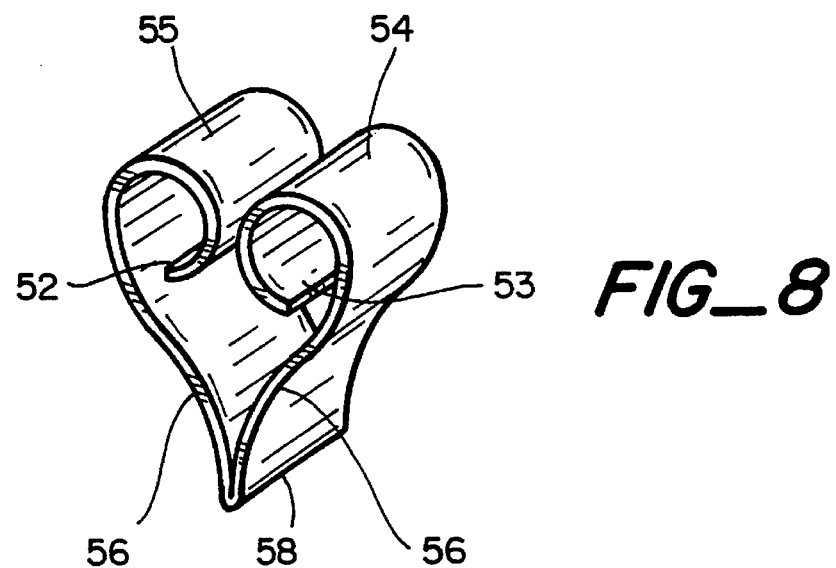
FIG_8
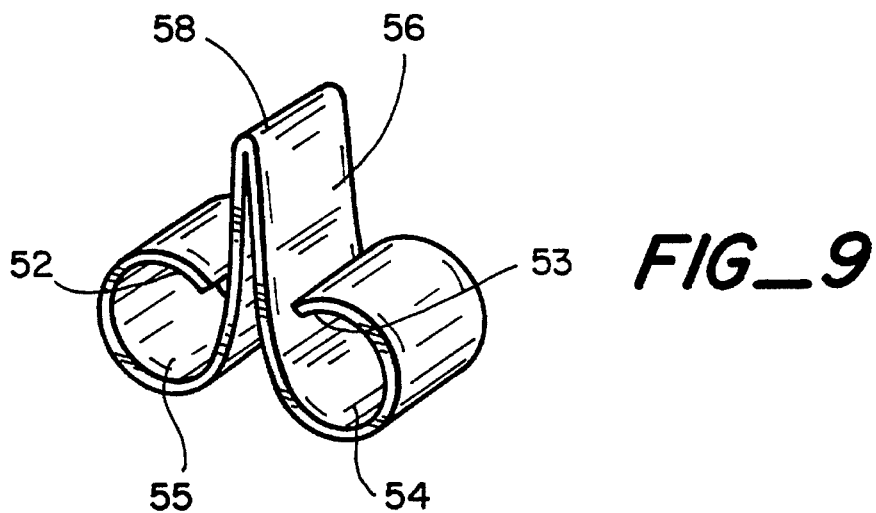
FIG_9

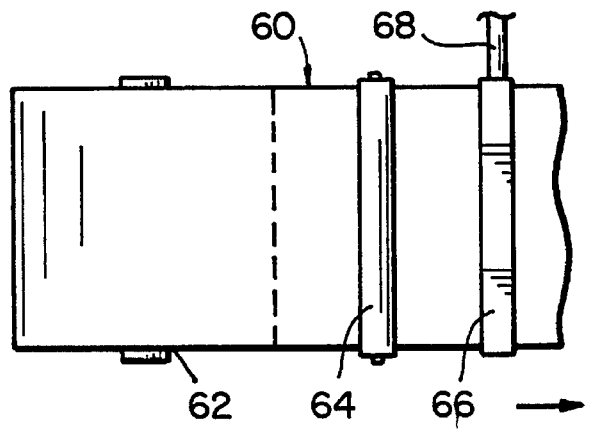
FIG_10
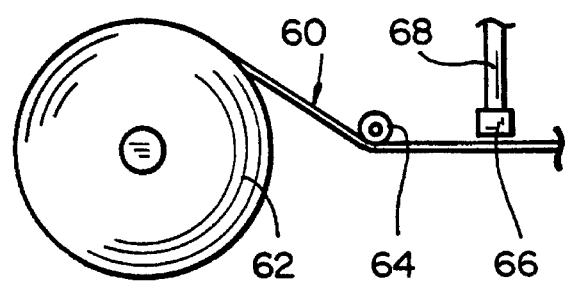
FIG_11
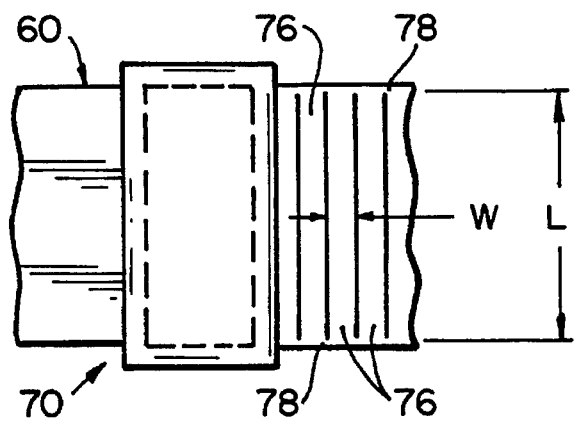
FIG_12
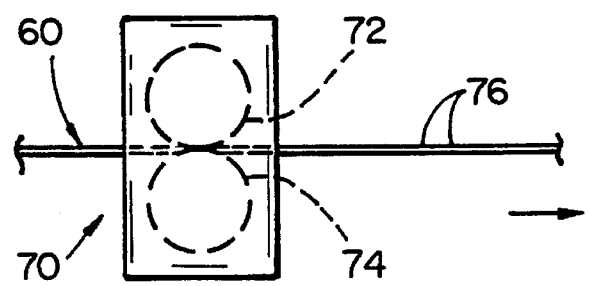
FIG_13

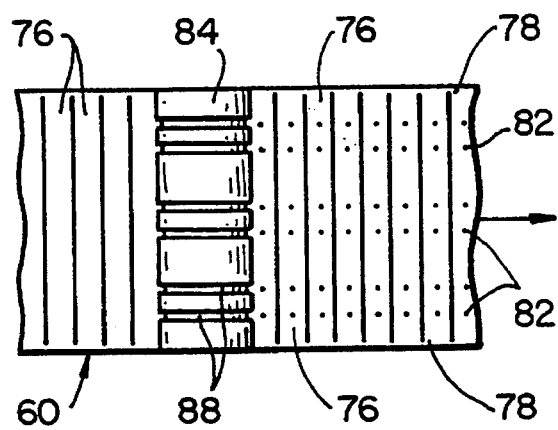
FIG_14
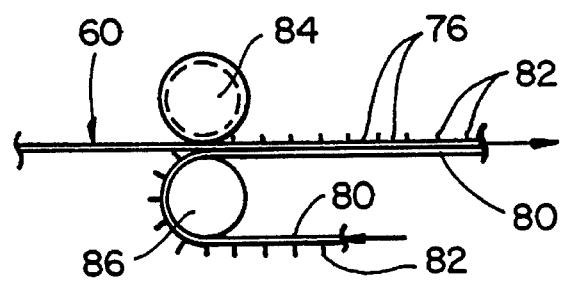
FIG_15
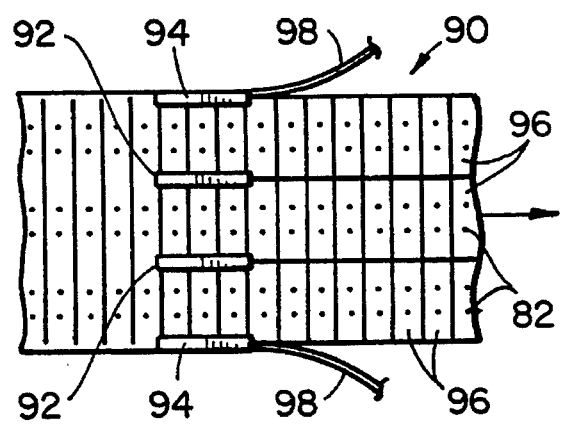
FIG_16
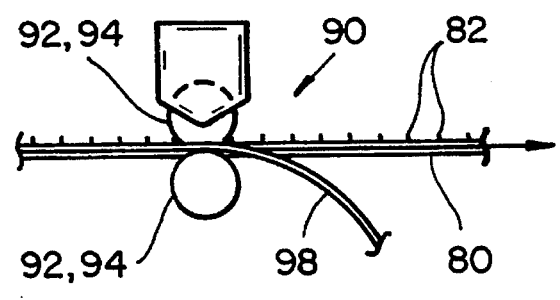
FIG_17

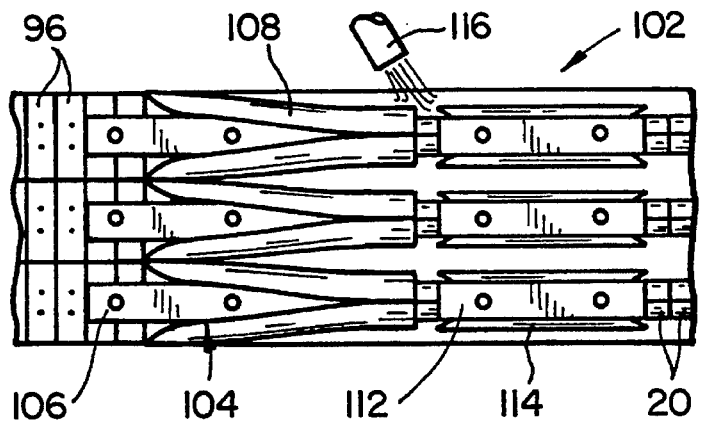
FIG_18
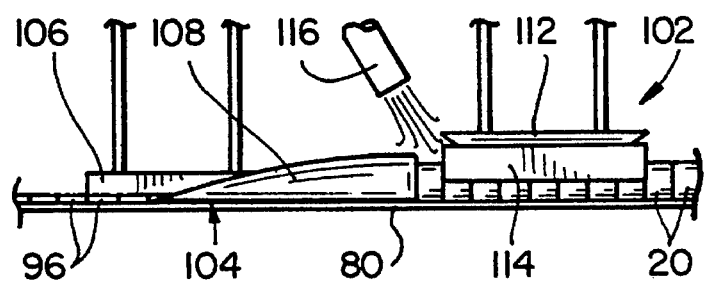
FIG_19
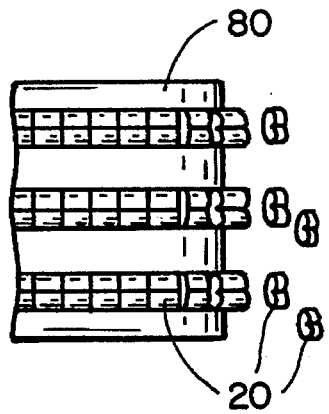
FIG_20
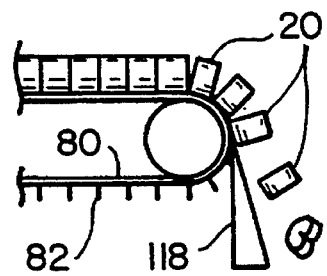
FIG_21

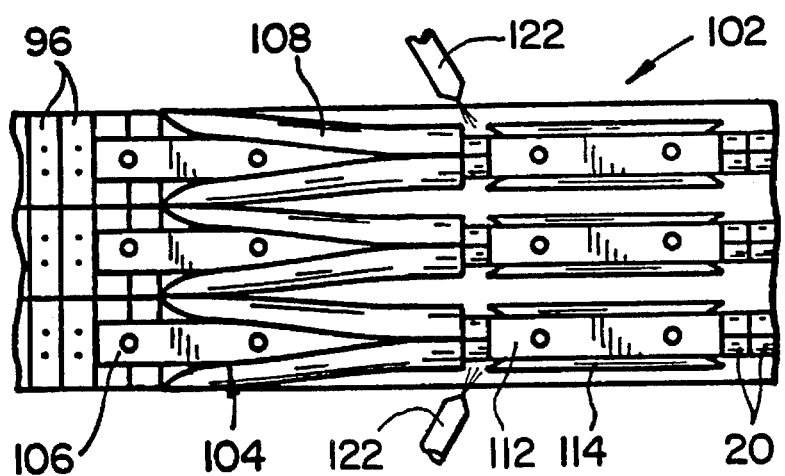
FIG_22
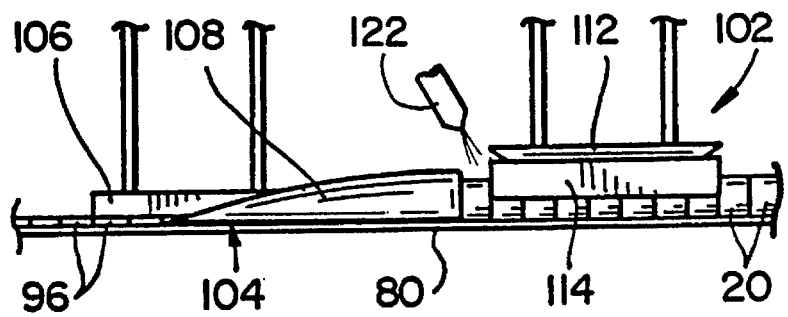
FIG_23

SHAPED LOOSE-FILL PACKAGING PARTICLE AND METHOD FOR MAKING THE SAME

This invention pertains generally to loose-fill materials for cushioning an article in a container and, more particularly, to a shaped particle for use as a loose-fill material, and a method for forming the same.

Heretofore, a variety of loose fill materials and shapes have been used for packaging an article in a container. Some of these loose fill materials have utilized recyclable materials such as paper or chipboard. U.S. Pat. No. 3,074,543, for example, suggests a loose fill material in the form of hollow cylinders formed from coated or uncoated paper or plastic, such as are provided by the cut ends of drinking straws.

U.S. Pat. No. 5,188,880 suggests the use of pieces of material cut from a larger sheet of corrugated material, such as recyclable corrugated cardboard or chipboard, that have a primary planar portion and planar fingers extending from the primary portion. The planar fingers may optionally be deflected into other planes to create a loose-fill element structure that can interlock with other loose-fill elements.

However, these conventional loose-fill materials have not been entirely successful in satisfying the need for recyclable flowable loose-fill packaging materials.

Therefore, a need exists for a loose-fill packing material that is effective and cost efficient. Desirably the loose-fill material should be environmentally friendly, such as is provided by a recyclable material.

It is a general object of the invention to provide a new and improved loose-fill material and a method for making the same.

Another object of the invention is to provide a loose-fill material and method of the above character which employs recyclable materials.

These and other objects are achieved in accordance with the invention by providing a shaped particle for use as a loose fill material to surround and cushion an article packaged within a container which comprises a strip of stiff yet flexible material having a plurality of convoluted regions. The convoluted regions being adapted to compress together to absorb mechanical energy in response to a mechanical force such as would be encountered during an impact. The structure of the shaped particle also prevents nesting of another shaped particle between the convoluted regions so that the convoluted regions are not prevented from compressing together in response to a force. The invention also provides a method for making embodiments of shaped particles according to the invention.

The purpose and advantages of the present invention will be apparent to those skilled in the art from the following detailed description in conjunction with the drawings.

FIG. 1 is a exploded isometric view, somewhat schematic, of a quantity of shaped particles for use as a loose-fill material in packaging an article in a container.

FIG. 2 is an isometric view of a configuration of an embodiment of a shaped particle according to the invention.

FIG. 3 is an isometric view of a planar strip of material such as may be used in making the shaped particle shown in FIG. 2.

FIG. 4 is an isometric view of an alternate configuration of an embodiment of a shaped particle.

FIG. 5 is an isometric view of another alternate configuration of an embodiment of a shaped particle.

FIG. 6 is an isometric view of a different alternate configuration of an embodiment of a shaped particle.

FIGS. 7–9 are isometric views of alternative configurations of another embodiment of a shaped particle according to the invention.

FIGS. 10–21 are views, somewhat schematic, of equipment and materials at several stages of making an embodiment of a shaped particle according to an embodiment of a method of the invention.

FIGS. 22–23 are views, somewhat schematic, of equipment and materials at several stages of making an alternate embodiment of a shaped particle according to an alternate embodiment of a method of the invention.

In FIG. 1, an embodiment of a shaped particle 20 according to the invention is illustrated in conjunction with the packaging of an article 22 in a container 24 which has a removable lid or top 26. The article is illustrated as being in the form of a bottle, but it can be anything that needs to be protectively packaged. The container is illustrated as being a cardboard box, but it can be any container which is suitable for packaging or shipping the article. The lid can be secured to the container by any suitable means such as taping or stapling. The shaped particles of the present invention may be used as a replacement for many types of conventional loose-fill materials, and therefore may generally be used in the same manner as conventional loose-fill materials.

FIG. 2 shows a preferred embodiment of a shaped particle 20. It comprises a strip or band of material 29 that is curled back upon itself to form a main loop 30. FIG. 3 shows a planar strip of material 29, such as may be used to form the shaped particle illustrated in FIG. 2. The strip of material has two broad opposing surfaces 31, 32 separated by the relatively thinner thickness of the strip, and two opposed end surface regions 34, 36 on a common surface 31 which are curled inward to form main loop 30. Surface 31 forms the outer surface of the shaped particle in FIG. 2 while surface 32 forms the inner surface. End regions 34, 36 are joined within the interior of the main loop using a thin layer, spot, or other distribution of adhesive 39. Adhesive 39 is interposed between the two joined end regions and is shown in dashed lines in that figure. However, placement of adhesive 39 is indicated on the unformed strip in FIG. 3. Other means for fastening, such as stapling, crimping, riveting, and the like may be used to join the end surface regions. The two broad opposing surfaces 36, 32 define a length (L) and width (W) dimension wherein the length is greater than the width. Generally the ratio of width to the longest dimension across the open tube-like face is between about 0.2:1 and 3:1 and more typically between about 0.5:1 and 1:1. The length, width and thickness (t) of the strip may be varied over a broad range to achieve the desired cushioning properties. Generally for paper, paperboard, and chipboard type materials, the thickness ranges between about 0.005 inches and about 0.02 inches. More typically, the material has a thickness ranging from about 0.01 inches and about 0.02 inches. However, when other materials are used, such as plastics, polymers, and the like, the useable range of thickness may be more extensive.

In one embodiment, the length of the planar strip used to make the shaped particle is about four inches long, the width is about ¾ inches, and the thickness is about 0.016 inches. These dimensions result in a shaped particle that is about ¾ inches wide and about 1 inch to 1.5 inches across the longest dimension (d) of the open tube-like structure as indicated in FIG. 2.

The inward folded and joined end regions 34, 36 form an extension tab 41 which has a length sufficient to preclude another of the shaped particles from intruding into the partially enclosed volume of space to prevents nesting by other similarly sized shaped particles. Suitable adhesives for joining the end regions are known in the art, such as solvent and hot-melt type adhesives, and are discussed in greater detail in connection with the method for making provided hereinafter. The inward folding of the end regions creates minor loops 40, 42 which partially enclose regions of space. Minor loops 40, 42 are contiguous with main loop 30.

The shaped particles may be made from suitable paperboard, chipboard, kraft paper, polymeric materials, and the like. Recycled and recyclable materials may be used, such as 100% recycled paperboard, 100% recycled chipboard, and 100% recycled kraft paper. The thickness and other characteristics of the material may be selected based on the desired final size of the shaped particle, the desired fill density, the desired degree of resiliency (which derives from the individual shaped particle characteristics and the combined interaction of the entire body of shaped particles placed in the container with the article). In one embodiment 16-gauge (0.016 inch thick) chipboard is used. However, it will be understood that any of a variety of suitable materials may be used, and though the use of recyclable materials is environmentally desirable, the invention is not limited to such materials. For example, plastics or other polymeric materials, resin coated or resin impregnated paper or pulp products, may be used.

The material from which an embodiment is made must be sufficiently flexible to be formed into the desired shape without creasing or cracking. It must also be capable of springing back to or near to its original shape after it is compressed. Generally, the material will have some resilience, although the types of materials which may be used is not limited to materials which are resilient in the conventional sense. As used here, a resilient material is a material which is non-rigid and has some spring-back quality. The spring-back characteristic may be a property of the material cell structure, may contribute to the resilience, or it may derive substantially from the configuration of the shaped particle elements alone or in combination with others.

An individual shaped particle 20 permits elastic deformation (e.g. deformation that does not permanently deform the structure) only for forces that have a component of force directed orthogonal to the pseudo-circumferential broad face 35 of the strip as shown in FIG. 2. Forces directed toward the open face 37 may not be absorbed by compression of loops 30, 40, 42 of a single shaped particle and such a force may deform the shaped particle, such as by crushing it. However, the shape of the particles provides for a distribution of particle orientation within a mass of particles surrounding an article in a container. Such a mass of particles is capable of absorbing forces applied from any direction. The partial interlocking of individual particles facilitated by the edges, creates synergistic effect to enhance the energy absorbing characteristics of the mass, and minimizes shaped particle migration.

Other shapes may be made by adding aditional curves, folds, and the like to the basic structure of the shaped particle. In FIG. 4, the tab 41 is elongated to meet the interior of the strip and adhesive is applied to join tab 41 to the inner surface of the main loop.

FIG. 5 shows a shaped particle having an additional feature. The strip of material is bent outward and has a crease or fold 48 located between the first and second end regions 34, 36 and extending across the width of the strip to form an outwardly projecting cusp opposite the side of the loop where the end portions come together, and results in a "heart-like" visual appearance. The fold may be provided to alter the deformation and cushioning characteristics or may alternatively be provided for decorative purposes. FIG. 6 illustrates an embodiment wherein the strip is bent inward toward tab 41 to form an inwardly projecting cusp opposite the side of the loop where the end portions come together, and results in a "figure-8" type appearance.

FIG. 7 shows a different embodiment of the invention wherein the conformational shape is retained without the use of an adhesive material to retain the shape. The shaped particle 50 includes a curved band 51 of stiff bendable material having a first end 52 and a second end 53 and having convoluted regions located between the ends including a first loop 54 and a second loop 55. The region between these two loops form a larger main loop 56. The convoluted regions including the first, second and main loops are adapted to compress together to absorb mechanical energy in response to a compressive mechanical force that may be applied to the convoluted region when the material is subjected to a mechanical impact.

Alternate forms of the embodiment illustrated in FIG. 7 are shown in FIGS. 8 and 9. These shaped particles have the features already described with respect to FIG. 7 but include the additional feature of a fold 58 between the first and second loops. This fold alters the characteristic of the main loop (which is no longer a smooth curve) and changes the overall shape of the particle.

The material from which the embodiments of the shaped particle illustrated in FIGS. 7–9 are made has the property that forces internal to the material that impose a preferential shape conformation on the material are relaxed and redistributed when the material is wet so that a different preferential shape conformation may be imposed on the material by first wetting the material and then drying the material shaped into the different shape conformation.

For example, a continuous sheet of material provided by a roll of material from which the strips are cut is manufactured as a generally flat sheet and tends to remain in that flat planar conformation. When the material is subjected to a mechanical force it will bend, but the internal forces exert a counter-balancing force that tends to return the material to the planar conformation when the external mechanical force is removed. In this example, the preferential shape conformation is a planar conformation. Once the material is convoluted into the desired shape by bending and curving the strip, it will retain a tendency to return to the planar conformation. However, by wetting the material the preference for the planar conformation can be eliminated and the so called "memory" of the conformation can be erased. A new preferential shape conformation is established by drying the material in the desired different shape conformation. Once dry, this shape conformation is preferred, and the material will tend to return or spring back to this "memorized" shape conformation after a distorting mechanical force is removed. This wetting and drying procedure permits the shaped particle to be made without adhering portions of the strip together with adhesive.

The aforedescribed embodiments are specific examples of a shaped particle for use as a loose fill material to surround and cushion an article packaged within a container. Each of the embodiments of a shaped particle includes a strip of material having a plurality of convoluted regions oriented such that imaginary surface normals to the convoluted regions are substantially confined to a single imaginary plane. The plurality of convoluted regions are adapted to compress together to absorb mechanical energy in response to an externally applied compressive mechanical force having a component of force directed along an imaginary line contained within the imaginary plane. Such an applied compressive mechanical force may result, for example, when a container holding an article, surrounded by shaped particle loose-fill is subject to an impact.

The material used for the strip should be sufficiently flexible to permit the strip of material to be bent and yet should be sufficiently stiff that the material will spring-back from the bending when the bending force is removed. While the material has some inherent resiliency by virtue of its bendable flexibility, much of the resiliency is derived from the structure of the shaped particle and the interaction of a body or mass of such shaped particles.

Each of the embodiments of the shaped particles according to the invention also include some means for preventing nesting of another comparably sized shaped particle between the convoluted regions so that the convoluted regions are not prevented from compressing together. The means for preventing nesting may be a convoluted region or may be a tab of material that extends between the convoluted regions a distance sufficient to prevent nesting but that does not extend so far that it prevents compression of the adjacent convoluted regions.

The strip from which the shaped particles are formed may have a constant or a variable width. When the width is not constant, the strip has an average width. The shaped particle also has a maximum dimension, such as the dimension measured across an open face of the tubular loop structure. In general, the ratio of the strip width to the maximum dimension of the shaped particle is between about 0.2:1 and about 3:1, and more typically between about 0.5:1 and about 2:1.

The invention also provides a method or making shaped particles. A preferred method of making an embodiment of a shaped loose fill particle having end sections joined by an adhesive layer is illustrated in FIGS. 10–21. These figures include top and side views of each of the steps in the method. The equipment is shown in simplified schematic form. An alternate embodiment of the method is described subsequently for the other embodiment of the shaped particle which does not require adhesive joining.

As shown in FIGS. 10–11, a continuous sheet 60 is unwound from an unwind roll 62 and guided toward a transverse die cutting station 70 by idler roller 64. Providing a continuous roll of material rather than individual flat sheets is preferred because it facilitates continuous production; however, separate sheets may be employed.

An adhesive application station 66 is provided between the idler roller 64 and transverse die cut station 70. Adhesive application station 66 provides means for applying an adhesive to selected regions of the sheet. Adhesive application station is connected to a source of adhesive (not shown) by suitable plumbing 68 and may contain other components for applying the particular adhesive, such as are know in the art.

Various conventional adhesives, such as hot melt, water activated adhesives, solvent activated adhesives, and the like may be used. It is preferable to apply the adhesive as a thin adhesive bead or as spaced apart adhesive dots to the unwound flat sheet at the regions that are to be joined prior to transverse cutting. Adhesive may also be sprayed onto a region. It is desirable to apply as little adhesive as possible consistent with adequate joining of the ends of the strip.

For example, for a ¾-inch strip width, providing an amount of adhesive that results in the deposit of a series of ¹⁄₁₆-inch diameter dots spaced about ¼-inch apart along a line near one end of each final sized strip will be sufficient. For example, if a sheet that is 40.5 inches wide is used, the ten 4-inch long strips may be cut from the roll, and about ¼ inch will be edge trimmed from each the edges. In this situation, adhesive will be applied at 4-inch intervals across the web of the continuous sheet as it is unrolled.

The adhesive may alternately be applied at other stages of the process, such as after transverse die cutting, or immediately prior to joining the ends of the curled strip (described hereinafter); however, such an application may require more complicated equipment or result in material handling problems because the cut material may not be uniformly flat at this stage.

It is preferred that the adhesive be deactivated after application to the material and prior to further handling of the sheet. When hot melt type adhesive is used, deactivation is accomplished by permitting the adhesive to dry, cure, solidify or the like. When solvent type adhesives are used, they also need time to dry or cure. Desirably the adhesive will be deactivated within a few seconds, one to two seconds for example, so that the length of the processing equipment can be kept as short as possible. Various conventional methods for accelerating the curing, solidifying, or drying may be used. The roll stock continues to move during deactivation and having a fast drying adhesive minimizes the distance a section of the sheet moves before the next processing step. Reactivation of the adhesive for joining the ends of the strips is described hereinafter.

As shown in FIGS. 12–13, the transverse die cutting station 70 includes a transverse die roller 72 including the cutting die (not shown) and a cutting surface roller 74 against which the cutting die strikes. Die cutting station cuts the continuous sheet of material 60 into a quantity of connected strips having the desired strip width (W), wherein each strip has a long length dimension (L) aligned parallel to the axis of the roll, and strips remaining are connected by a narrow bridge 78 of material at each of the two edges of the sheet.

Each strip 76 is then engaged with a moving belt 80 having a quantity of small spikes or pins 82 which protrude from the belt into the still connected strips 76 for holding the transverse strips to the belt, as illustrated in FIGS. 14–15. Engagement of pins 82 with strips 76 is facilitated by upper and lower guide rollers 84, 86 which bring the pins into contact with the strips. Upper roller 84 has slots 88, that permit pins 82 to pass through the sheet 60 without being deformed by the upper roller. Lower guide roller 86 is coupled to means for driving the spiked transport belt, such as a chain and sprocket coupled to an electric motor (not shown).

Engaging the strips 76 to the spiked belt prior to cutting the strips into shorter lengths is important because the engagement maintains the individual bands as an organized array which can be processed in a sheet-like fashion. For example, in one embodiment strips 76 are approximately forty inches by ¾ inches and connected at the edge of the sheet by a continuous ¼ inch bridge 78. During the next processing step, the strips 76 in this embodiment are slit into four-inch lengths and the bridge 78 is trimmed from the edge. Without the spiked belt, the friction from the slitting and edge trimming operation may scatter and disorient the small strips 96 and make further automated processing extremely difficult.

After the strips have been engaged to the spiked belt the sheet moves into a slitting and edge trimming station 90, as shown in FIGS. 16–7. The slitting is accomplished by slitting cutters 92, while the edge trimming operation is accomplished by edge cutters 94. While slitting and edge trimming may be performed as separate steps and/or with different equipment type, they are conveniently performed together.

As the connected strips 76 move into the slitting and edge trimming station, the strips are cut into shorter length bands or strips 96 having the desired length dimension and concurrently the edge is trimmed to remove the connecting bridge 78 of material. The two edge strips 98 are removed from the belt and are not used in the final shaped particle. In the drawing, the sheet is illustrated as being slit into three bands, however, it will be realized that more or fewer slitting cutters may be provided to create more or fewer finally sized strips 96. While not preferred, it will be readily apparent that a single narrow roll of material may be used without the need for slitting the roll into shorter strips. For example, a continuous roll of material having a four-inch web may be unwound and used. Transverse cutting, and edge trimming may be optional in such situations depending on the particular equipment employed.

Next, strips 96 are formed at a forming station 102 as illustrated in FIGS. 18–19. Forming may include such operations as bending, curling, folding, curving, and the like. Strips 96 are engaged to spiked belt 80 and are continuously moved into forming station 102 where the flat planar bands 96 are formed to create the convoluted non-planar strip of the shaped loose-fill particle. Forming station includes a series of forming guide pairs 104, including an inner guide 106 and an outer guide 108. The inner and outer forming guides gradually urge the planar strip 96 into the desired convoluted conformation. The convolutions formed within a particular embodiment of a shaped particle may include curves, curls, folds, bends, and the like. While the illustrated embodiment shows only a single forming guide pair 104 for shaping each band 96, it will be understood that more than one guide pair may be employed in succession to provide the desired particle conformation.

Each of the embodiments of the shaped particle illustrated in FIGS. 2, 4, 5 and 6, may be formed in accordance with this method wherein a planar band is formed into a non-planar convoluted shape which encloses a convex region of space into which the particle can compress. However, the embodiment illustrated in FIGS. 5–6 includes a fold. Such a fold may be accomplished in a variety of conventional ways, such as by gripping and releasing the band either before or after it is formed into the curled shape, using suitable equipment. Each formed particle is mechanically constrained to the formed shape from the time it leaves the forming guides until the adhesive previously applied has been reactivated and then cured, dried or solidified to accomplish the desired joining. Each formed particle is constrained by engagement with pins 82 from one side, and a mechanical constraint including top constraint 112 and side constraint 114.

As illustrated in FIGS. 18–19, the adhesive is reactivated after the particle has been shaped at the forming station so that the adhesive will adhere one portion of the formed strip to the other portion of the formed strip which are brought into contact with one another by the forming operation. If a solvent based adhesive is used, the adhesive is reactivated by applying the solvent. Water may be an appropriate solvent for some adhesives. If a hot melt type adhesive is used, the meltable material may be softened by heating it. Direct contact is not necessary, and the heat may be applied using hot hair, heated lamps, electric coils, infrared sources, a heated mandril, and the like.

In some embodiments, the mechanical constraint may also serve to reactivate a hot melt type adhesive by heating the hot melt material. For example, upper constraint 112 may include a source of heat which is directed at the joint portion of the formed strip, or a source of heated air 116 may be used as shown.

The shaped conformation is held by applying a holding force to hold the first portion of the formed strip to the second portion until the adhesive retains a set, and the formed shape is fixed. The holding force is then released and the particles are detached from the spiked belt. Such detachment may be accomplished by lifting the particles from the moving belt using a wedge 118; however, other suitable means may alternatively be used.

In a second embodiment of the method according to the invention, no adhesive is used to form the shaped particles. For example, the shaped particles illustrated in FIGS. 7–9 do not require adhesive joining of end regions of the strip. The method is otherwise similar to that described for the adhesively joined type of shaped particles. Therefore only the differences from the method described are discussed hereinafter.

In this alternative embodiment of the method, the adhesive application station 66 (shown in FIGS. 10–11) is not needed, and no adhesive is applied to the sheet material during the process. Consequently, there is no need to allow time for deactivation of any adhesive prior to transverse die cutting, so that this deactivation step is also eliminated from the process. Similarly, there is no need to reactivate the adhesive after the particles have been formed, or to allow the adhesive to dry, cure, solidify, or the like after joining (such as occurs in the steps associated with FIGS. 18–19).

Instead, the second embodiment of the method substitutes a wetting operation and a drying operation to fix and maintain the formed shape of the particle. Fixing the convoluted particle shape after the forming step includes wetting the shaped convoluted strip while mechanically confining the strip to the desired shape conformation. When a sheet of material such as paperboard, chipboard, Kraft paper, and the like are originally manufactured, the various manufacturing operations tend to align the internal constituents of the material, including fibrous element when present. An equilibrium is established between the various internal forces and stresses within the material so that the material retains its shape after manufacture. When the material is flexed, or bent within the elastic deformation limits of the material, the material tends to spring back to the original or "memorized" configuration it had at the time of its manufacture. This memory is utilized in the first embodiment to provide a spring-like restoring force to the shaped particle. In the first embodiment the adhesive is required to retain the strip in a nonequilibrium condition. However, the memory effect is also utilized in a different way in this alternative embodiment so that the need for an adhesive is eliminated.

In this second embodiment, the memory of the equilibrium condition established at the time of manufacture is effectively erased and replaced by a "memory" of a new conformational shape as the equilibrium condition.

Wetting the paperboard, chipboard, Kraft paper, or the like materials from which a strip is made with water relaxes the internal structure so that the memory of the planar (or rolled) orientation is erased so that a new equilibrium condition for the conformation of the formed particle shape may be fixed and maintained without an external holding force, such as an adhesive to join portions of the strip.

Subsequent drying of the wet convoluted non-planar formed strip while mechanically confining the strip to the desired shape establishes the new equilibrium. When the shaped particle is subsequently compressed in a packaging application, the shaped particle tends to spring back to its new equilibrium conformation.

As illustrated in FIGS. 22–23, means for wetting the formed particles such as nozzles 122 are provided at the exit from the forming guide pair 104. The volume of water discharged from nozzles 122 may generally depend on the characteristics of the material, including its thickness and absorbency. Nozzles 122 are connected via suitable tubing (not shown) to a source of water (possibly delivered under some positive pressure). Other means for wetting the formed particles may alternately be used, such as dripping water over the particles or moving the particles through a water filled trough, for example.

After the particles have been moistened so that the internal structure can relax, they are dried by suitable drying means, such as the application of heat from a stream of heated air, exposure to radiant heat lamps, heating coils, infrared radiation sources, and the like. Desirably the formed particles should be mechanically constrained during the drying operation so that the proper shape is retained; however, the need for continual restraint is less stringent than for adhesively joined particles.

While a particular embodiment of the invention has been described in detail, it will be understood that the invention may be implemented through alternative embodiments. Thus, the scope of the present invention is not intended to be limited to the embodiments described above, but is to be defined by the appended claims their equivalents and their equivalent language.

All publications and patent applications cited in this specification are herein incorporated by reference as if each individual publication or patent application were specifically and individually indicated to be incorporated by reference.

What is claimed is:

1. A shaped particle for use as a loose fill material to cushion an article within a container, said shaped particle comprising:

a single strip of thin stiff bendable non-foam material which is curled back upon itself to form a single-layer loop with two opposing end regions coming together in back-to-back relationship on one side of the loop and extending into the loop;

said end regions extending into the loop a distance sufficient to preclude other similar shaped particles from nesting within the loop.

2. A method for making a shaped particle, said method comprises the steps of:

providing a sheet of thin formable material;

cutting a planar strip of material having a desired length and width from said sheet of material;

forming said planar strip to create a convoluted non-planar strip;

fixing said convoluted non-planar strip to permanently maintain said convoluted non-planar particle shape.

3. The method in claim 2, wherein said step of fixing said convoluted particle shape comprises the steps of:

adhering a first portion of said formed strip to a second portion of said formed strip to maintain said formed shape.

4. The method in claim 3, wherein said step of adhering a first portion of said formed strip to a second portion of said formed strip to maintain said formed shape comprises the steps of:

applying an adhesive to at least one of said first portion and said second portion of said formed strip;

applying a holding force to hold said first portion of said formed strip to said to said second portion until said adhesive retains a set to maintain said formed shape; and releasing said holding force.

5. The method in claim 4, wherein said step of applying a holding force is the step of applying a compressive force to hold said first portion of said formed strip to said to said second portion.

6. The method in claim 3, wherein said step of adhering a first portion of said formed strip to a second portion of said formed strip to maintain said formed shape comprises the steps of:

applying an adhesive to selected regions of said material prior to said step of forming said planar strip;

applying a holding force to hold a first portion of said formed strip to a second portion of said strip;

activating said adhesive to adhere said first portion of said formed strip to said second portion of said strip which are brought into contact by said step of forming;

applying a holding force to hold said first portion of said formed strip to said to said second portion until said adhesive retains a set to maintain said formed shape; and releasing said holding force.

7. The method of claim 6, wherein the holding force is applied by applying a compressive force to hold said first portion of said formed strip to said to said second portion.

8. The method in claim 2, wherein said step of fixing said convoluted particle shape comprising the steps of:

wetting said convoluted non-planar strip while mechanically confining said strip to the desired shape to relax said material and to erase the memory of said planar orientation so that said formed shape is maintained without a holding force;

drying said wetted convoluted non-planar strip while mechanically confining said strip to the desired shape to maintain said formed shape.

9. The method in claim 2, wherein said step of providing a sheet of thin formable material includes the step of unwinding said sheet of thin formable material from a supply roll; and said step of cutting a planar strip of material having the desired length and width from said sheet of material comprises the steps of:

transverse die cutting said sheet of material into a quantity of connected strips having the desired strip width, wherein each said strip has a long dimension aligned parallel to the axis of said roll, said strips remaining connected by a narrow bridge of material at the two edges of said sheet;

engaging each said strip with a moving belt having a quantity of small spikes which protrude from said belt into said strips for holding said transverse strips to said belt;

slitting said material to cut each said strip to the desired length dimension and concurrently edge trimming said material to remove said connecting bridge of material and separate said strips;

forming said planar cut strip into a non-planar shape wherein said formed strip encloses a convex region of space;

adhering a first portion of said formed strip to a second portion of said formed strip to maintain said formed shape;

disengaging said particles from said spiked belt.

10. The method in claim 8, wherein said step of wetting comprises the step of exposing said material to steam.

11. A method for making a shaped loose-fill particle, said method comprises the steps of:

providing an unwind roll of thin formable material;

unwinding said roll of material to present a flat sheet of thin formable material;

applying an adhesive to selected regions of said material prior to said step of forming said planar strip;

allowing said adhesive to deactivate;

transverse die cutting said sheet of material into a quantity of connected strips having the desired strip width, wherein each said strip has a long dimension aligned parallel to the axis of said roll, said strips remaining connected by a narrow bridge of material at the two edges of said sheet;

engaging each said strip with a moving belt having a quantity of small spikes which protrude from said belt into said strips for holding said transverse strips to said belt;

slitting said material to cut each said strip to the desired length dimension and concurrently edge trimming said material to remove said connecting bridge of material and separate said strips;

forming said planar strip to create a convoluted non-planar strip;

forming each said planar strip into a non-planar convoluted shape wherein said formed strip encloses a convex region of space;

applying a holding force to hold a first portion of said formed strip to a second portion of said strip;

activating said adhesive to adhere said first portion of said formed strip to said second portion of said strip which are brought into contact by said step of forming;

applying a holding force to hold said first portion of said formed strip to said to said second portion until said adhesive retains a set to maintain said formed shape; and releasing said holding force.

12. The method in claim 11, further comprising the step of disengaging said particles from said spiked belt.

13. The shaped particle of claim 1 wherein the two opposed end regions are joined together within the loop.

14. The shaped particle of claim 13 wherein the two opposed end regions are joined together by means selected from the group consisting of an adhesive, a fastener, crimping, and combinations thereof.

15. The packing material of claim 1 wherein the strip of material has a shape memory which causes the strip to tend to return to the looped configuration when deflected therefrom.

16. The shaped particle of claim 1 wherein the strip is fabricated of a material selected from the group consisting of paperboard, kraft paper, and chipboard.

17. The shaped particle of claim 1, wherein the strip is fabricated of a biodegradable material, and has a thickness on the order of 0.005–0.02 inch and a width on the order of at least 10 times the thickness.

18. A loose fill packing material comprising a strip of material which is curled back upon itself to form a loop with opposing end portions of the strip coming together in back-to-back relationship on one side of the loop and extending into the loop.

19. The packing material of claim 28, wherein the material comprises a non-foam material.

20. The packing material of claim 18 wherein the opposing end portions of the strip are secured together.

21. The packing material of claim 20 wherein the end portions are secured together by means selected from the group consisting of an adhesive, a fastener, crimping, and combinations thereof.

22. The packing material of claim 18 wherein the strip of material has a shape memory which causes the strip to tend to return to the looped configuration when deflected therefrom.

23. The packing material of claim 18 wherein the loop has a smooth curvature opposite the side where the end portions of the strip come together.

24. The packing material of claim 18 wherein the strip is bent to form an outwardly projecting cusp opposite the side of the loop where the end portions come together.

25. The packing material of claim 18 wherein the strip is bent to form an inwardly projecting cusp opposite the side of the loop where the end portions come together.

26. The packing material of claim 18 wherein the end portions extend into the loop a distance sufficient to prevent other pieces of similar packing material from nesting within the loop.

27. The packing material of claim 18 wherein the strip is fabricated of a material selected from the group consisting of paperboard, kraft paper, and chipboard.

28. The method of making a shaped particle of claim 2 wherein the material is selected from the group consisting of paperboard, kraft paper, and chipboard.

29. The method of making a shaped particle of claim 11, wherein the material is selected from the group consisting of paperboard, kraft paper, and chipboard.

30. In a packing system: a container, an article within the container, and a plurality of pieces of loose fill packing material surrounding the article and providing cushioning support for the article within the container, each of said pieces of loose fill packing material comprising a strip of material which is curled back upon itself to form a loop with opposing end portions of the strip coming together in back-to-back relationship on one side of the loop and extending into the loop.

31. The packing system of claim 30 wherein the end portions extend into the loop a distance sufficient to prevent other pieces of the loose fill packing material from nesting within the loop.

32. The packing system of claim 31 wherein the opposing end portions of the strip are secured together.

33. The packing material of claim 32 wherein the end portions are secured together by means selected from the group consisting of an adhesive, a fastener, crimping, and combinations thereof.

34. The packing system of claim 31 wherein the strip of material has a shape memory which causes the strip to tend to return to the looped configuration when deflected therefrom.

35. The packing system of claim 31 wherein the loop has a smooth curvature opposite the side where the end portions of the strip come together.

36. The packing system of claim 31 wherein the strip is bent to form an outwardly projecting cusp opposite the side of the loop where the end portions come together.

37. The packing system of claim 31 wherein the strip is bent to form an inwardly projecting cusp opposite the side of the loop where the end portions come together.

38. The packing system of claim 31, wherein the strip is fabricated of a non-foam material.

39. The packing system of claim 31 wherein the strip is fabricated of a material selected from the group consisting of paperboard, kraft paper, and chipboard.

40. A loose fill packing material comprising a strip of material which is bent back upon itself in a predetermined shape comprising a cusp, with end portions of the strip curling away from the cusp in opposite directions and extending back toward each other on opposite sides of the cusp.

41. The packing material of claim 40 wherein the strip of material has a shape memory which causes the strip to tend to return to the predetermined shape when deflected therefrom.

42. The packing material of claim 40, wherein the strip is fabricated of a non-foam material.

43. The packing material of claim 40 wherein the strip is fabricated of a material selected from the group consisting of paperboard, kraft paper, and chipboard.

* * * * *